US008346829B2

(12) United States Patent
Ray et al.

(10) Patent No.: US 8,346,829 B2
(45) Date of Patent: Jan. 1, 2013

(54) METHODS AND APPARATUS FOR REDUCING OR AVOIDING USE OF NON-SHIFT BASED DIVISIONS IN A COMMUNICATIONS DEVICE

(75) Inventors: Siddharth Ray, Bridgewater, NJ (US); Sundeep Rangan, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 951 days.

(21) Appl. No.: 12/412,340

(22) Filed: Mar. 26, 2009

(65) Prior Publication Data
US 2009/0248770 A1 Oct. 1, 2009

Related U.S. Application Data

(60) Provisional application No. 61/041,288, filed on Apr. 1, 2008.

(51) Int. Cl.
*G06F 7/00* (2006.01)
*G06F 17/10* (2006.01)
*G06F 7/52* (2006.01)
(52) U.S. Cl. .......................... 708/209; 709/300; 709/306
(58) Field of Classification Search .................. 708/209, 708/300, 306
See application file for complete search history.

(56) References Cited

U.S. PATENT DOCUMENTS

| 7,437,392 | B2 * | 10/2008 | Koster et al. ................... 708/300 |
| 2009/0245442 | A1 * | 10/2009 | Siddharth et al. ............. 375/347 |

OTHER PUBLICATIONS

Cyca, Turner: "Bit-Serial Digital Filter Implementation using a Custom C Compiler" IEEE Asia Pacific Conference on Circuits and Systems, Dec. 2006, pp. 534-537, XP031070891 Piscataway, US p. 535, left-hand column, paragraph 3.
Fermas et al.: "Hardware implementation of free division block-based BSS algorithm" IEEE North-East Workshop on Circuits and Systems and Taisa Conference, Jun. 28, 2009, pp. 1-4, XP031548661 Piscataway, US abstract.
Gui-Qing Zhang et al.: "Self-Calibration Algorithm and FPGA Implementation for Data Acquisition" IEEE International Conference on Control and Automation, May 30, 2007, pp. 2548-2553, XP031220491 Piscataway, US section II B.
International Search Report & Written Opinion—PCT/US2009/038700, International Search Authority—European Patent Office—Feb. 4, 2010.
Paker et al.: "Hardware and software implementations of an MMSE equalizer for MIMO-OFDM based WLAN" IEEE Workshop on Signal Processing Systems Design and Implementation, Nov. 2, 2005, pp. 1-6, XP010882532 Piscataway, US section I I I C.

* cited by examiner

*Primary Examiner* — Tammara Peyton
(74) *Attorney, Agent, or Firm* — Stanton Braden

(57) ABSTRACT

Methods and apparatus which reduce or completely eliminate non-shift based divisions as part of estimating transmitted symbols and/or generating slicing parameters corresponding to two symbol transmission streams in a wireless communication system are described. A linear least squares error estimation filtering module performs symbol estimations and/or slicing parameter generation while avoiding non-shift based division operations. The linear least squares estimation module generates intermediate parameters, and implements equations which facilitate symbol estimation utilizing shift based divisions while avoiding non-shift based divisions.

20 Claims, 14 Drawing Sheets

METHODS AND APPARATUS FOR REDUCING OR AVOIDING USE OF NON-SHIFT BASED DIVISIONS IN A COMMUNICATIONS DEVICE

RELATED APPLICATIONS

The present application claims the benefit of U.S. Provisional Patent Application Ser. No. 61/041,288, filed Apr. 1, 2008 titled "SYSTEMS AND METHODS FOR REDUCING DIVISIONS", which is assigned to the assignee of the present application and which is hereby expressly incorporated by reference.

FIELD

Various embodiments relate to wireless communications, and more particularly, to methods and apparatus which can be used to reduce or eliminate non-shift based division operations when, for example, performing linear least square error filtering in a communications device.

BACKGROUND

In a wireless communication system, a receiver often has to generate an estimate corresponding to a signal received from a transmitter prior to performing decoding. Along with the signal estimate, additional parameters that affect the decoding based on the estimate may also have to be computed. Typically, these parameters are used to soft/hard decode the estimates and are sometimes referred to as slicing parameters.

Various aspects of the signal processing are generally done in the physical layer of the receiver using fixed point arithmetic. In fixed point arithmetic, each of the quantities are represented using a finite number of bits. It is highly desirable to have low complexity with regard to the fixed point processing, e.g., to allow for lower cost implementations, faster processing, and/or lower power consumption. Division by numbers that are powers of two can be implemented using low complexity shift operations. However, division by numbers that are not powers of two increases the complexity of the implementation. It would be advantageous if methods and apparatus were developed which could avoid or reduce the number of non-shift based division operations so as to reduce complexity.

In systems where a receiver is attempting to recover transmitted symbols corresponding to two different transmission streams, the number of fixed point computations in the symbol estimation processing is typically significantly higher than when attempting to just recover symbols corresponding to a single transmission stream. Thus in such a situation it would be highly beneficial if methods and apparatus that reduced computational complexity were implemented.

Based on the above discussion there is a need for methods and apparatus that reduce or completely eliminate non shift based divisions while estimating transmitted symbols and/or slicing parameters corresponding to multiple, e.g., two, symbol transmission streams.

SUMMARY

Methods and apparatus which reduce or completely eliminate non-shift based divisions while estimating the transmitted symbols and/or generating slicing parameters corresponding to two symbol transmission streams in a wireless communication system are described.

A linear least squares error estimation filtering module performs symbol estimations and/or slicing parameter generation operations while avoiding non-shift based division operations. The linear least squares estimation module generates intermediate parameters, and implements equations which facilitate symbol estimation utilizing shift based divisions while avoiding non-shift based divisions.

An exemplary method of operating a linear least squares error (LLSE) filtering module, in accordance with some embodiments, comprises: generating a set of intermediate parameter values based on a set of channel gain values and a noise value by performing a plurality of addition and subtraction operations while avoiding the use of any division or multiplication operations; generating filter coefficient information from said set of intermediate parameter values by performing multiplications, additions and shift based division operations while avoiding the use of any non-shift based division operations; and performing first and second filtering operations on first and second symbols, respectively, using first and second filters configured in accordance with said generated filter coefficient information, to generate first and second estimated transmitted values. A exemplary communications device in accordance with some embodiments comprises: a linear least squares error filtering module including at least one processor configured to: generate a set of intermediate parameter values based on a set of channel gain values and a noise value by performing a plurality of addition and subtraction operations while avoiding the use of any division or multiplication operations; generate filter coefficient information from said set of intermediate parameter values by performing multiplications, additions and shift based division operations while avoiding the use of any non-shift based division operations; and perform first and second filtering operations on first and second symbols, respectively, using first and second filters configured in accordance with said generated filter coefficient information, to generate first and second estimated transmitted values. The linear least squares error filtering module further comprises memory coupled to said at least one processor.

While various embodiments have been discussed in the summary above, it should be appreciated that not necessarily all embodiments include the same features, and some of the features described above are not necessary but can be desirable in some embodiments. Numerous additional features, embodiments and benefits of various embodiments are discussed in the detailed description which follows.

DETAILED DESCRIPTION

Figure 1:
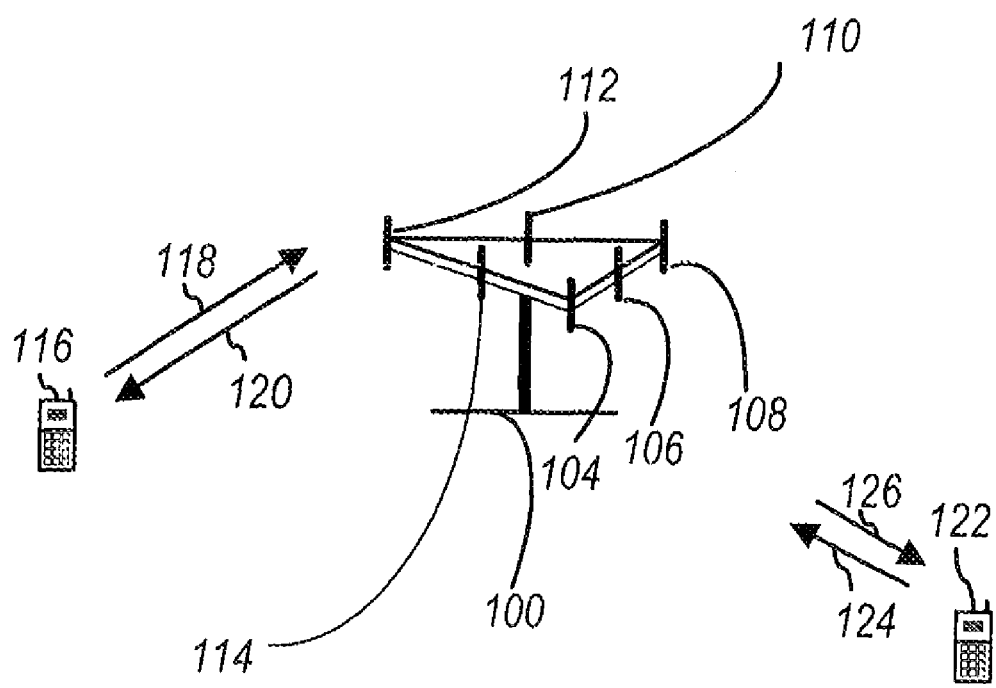
FIG. 1 illustrates a multiple access wireless communication system according to one embodiment.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as access node, base station, a Node B, wireless communications device, or some other terminology. An access terminal may also be called a wireless terminal, user equipment (UE), a wireless communication device, terminal, mobile node, mobile, end node, or some other terminology.

Figure 2:
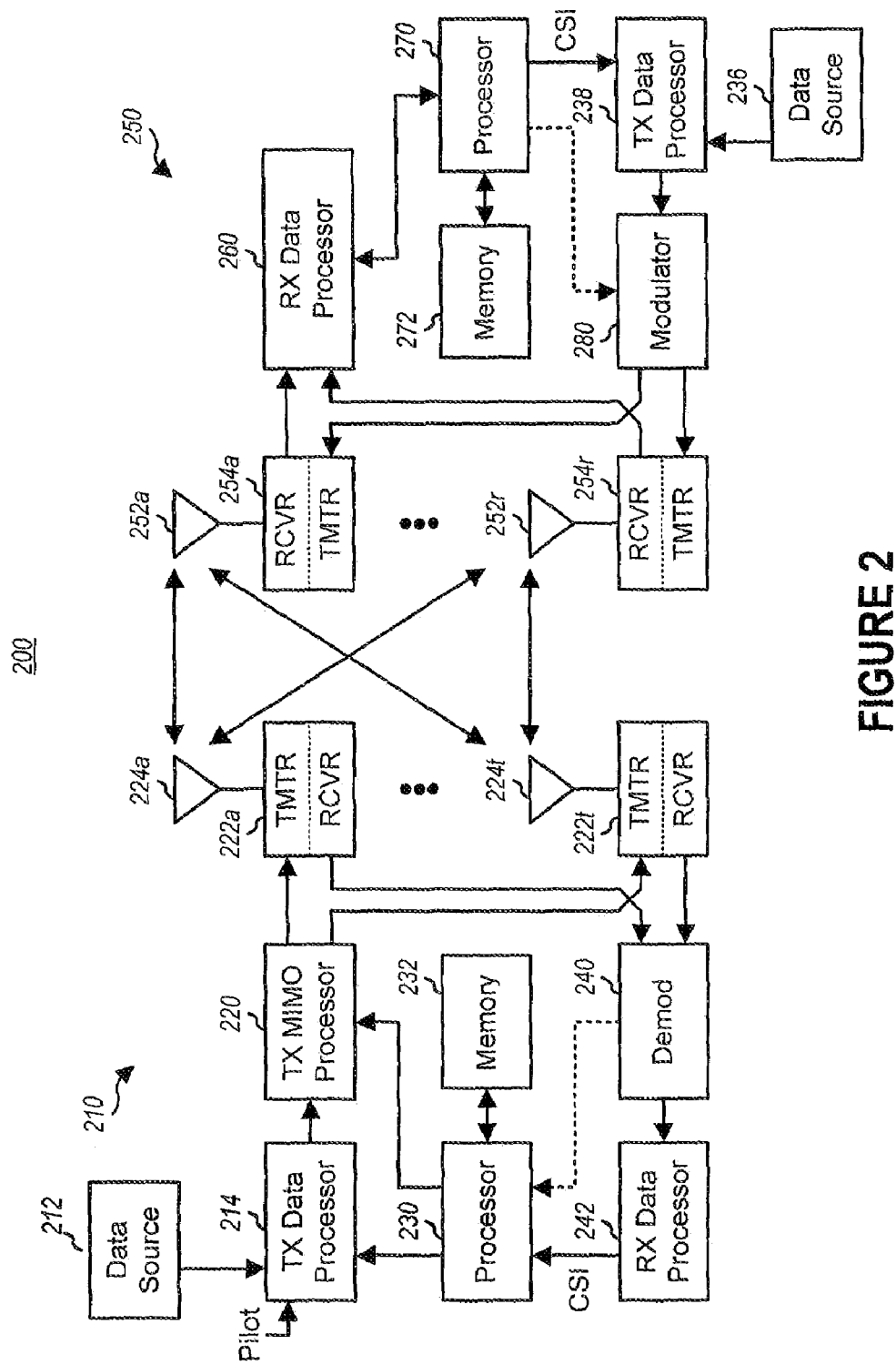
FIG. 2 is a block diagram of an exemplary communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for each of the data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Some embodiments are directed to a method to reduce or completely eliminate non-shift based divisions while estimating the signals of two interfering transmitters in a communication system.

Consider a communication system where, a receiver needs to estimate the transmitted signals from two interfering transmitters prior to decoding. Along with the signal estimates, additional parameters that affect the decoding of the estimates also need to be computed. Typically, these parameters are used to soft/hard decode the estimates and we will refer to them as slicing parameters. Various aspects of the signal processing are generally done in the physical layer of the receiver using fixed point arithmetic. In fixed point arithmetic, each of the quantities are represented using a finite number of bits. It is highly desirable to have low complexity with regard to the fixed point processing, e.g., to allow for lower cost implementations, faster processing, and/or lower power consumption. Division by numbers that are not powers of two increases the complexity of the implementation. An exemplary method reduces or completely eliminates divisions while estimating the signals and the slicing parameters of two interfering transmitters in a communication system.

Figure 3:
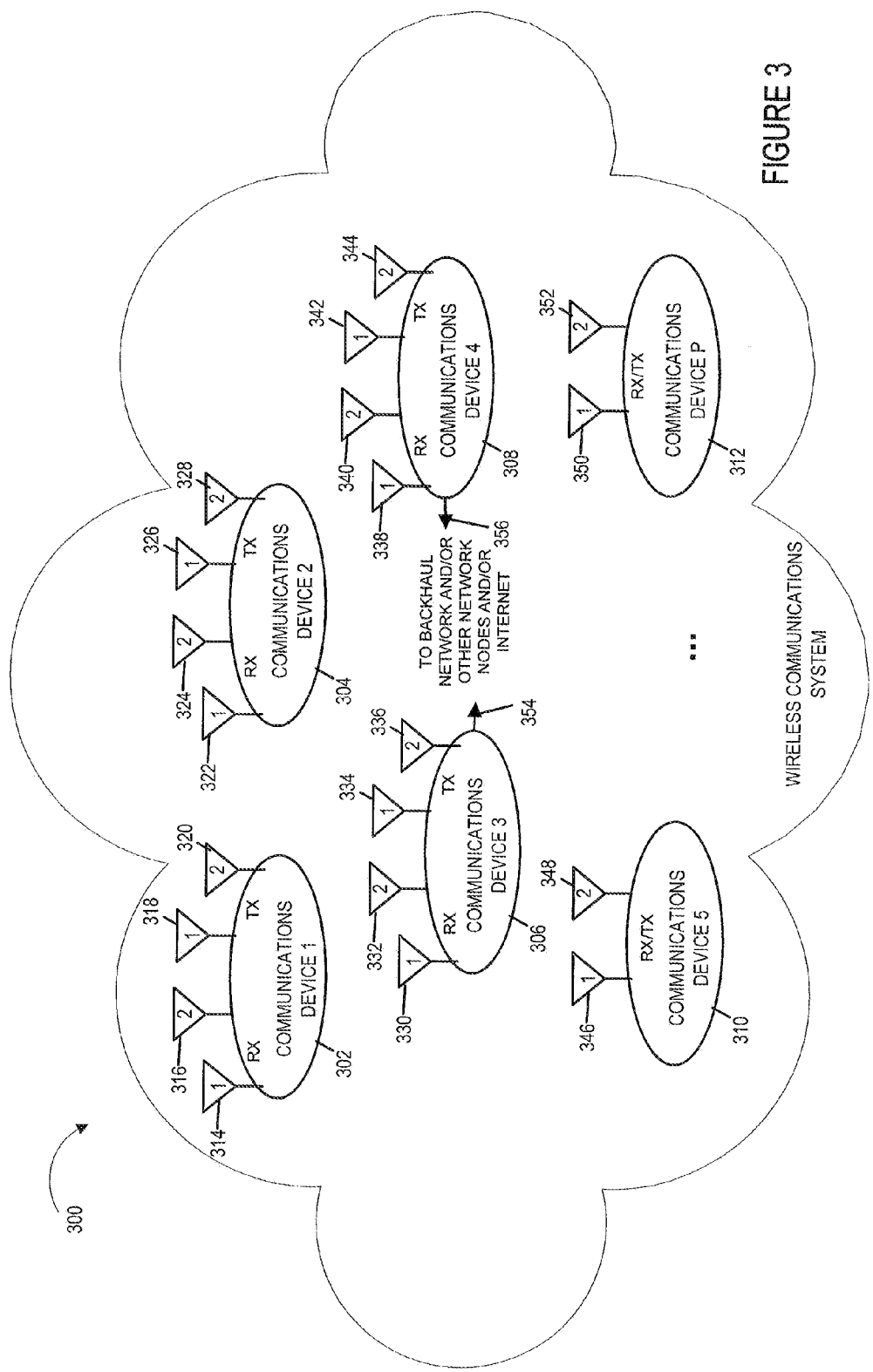
FIG. 3 is a drawing of an exemplary wireless communications system in accordance with an exemplary embodiment.

FIG. 3 is a drawing of an exemplary wireless communications system 300 in accordance with an exemplary embodiment. Exemplary wireless communications system 300 includes a plurality of communications devices (communications device 1 302, communications device 2 304, communications device 3 306, communications device 4 308, communications device 5 310, . . . , communications device P 312). Some of the communications devices are mobile wireless communications devices, e.g., mobile access terminals, which may move through the system 300, while other communications devices are stationary communications devices, e.g., access points such as base stations. Exemplary wireless communications device 1 302 includes 2 receive antennas (receive antenna 1 314, receive antenna 2 316) and 2 transmit antennas (transmit antenna 1 318, transmit antenna 2 320). Exemplary wireless communications device 2 304 includes 2 receive antennas (receive antenna 1 322, receive antenna 2 324) and two transmit antennas (transmit antenna 1 326, transmit antenna 2 328). Exemplary wireless communications device 3 306 includes 2 receive antennas (receive antenna 1 330, receive antenna 2 332) and two transmit antennas (transmit antenna 1 334, transmit antenna 2 336). Exemplary wireless communications device 4 308 includes 2 receive antennas (receive antenna 1 338, receive antenna 2 340) and 2 transmit antennas (transmit antenna 1 342, transmit antenna 2 344). Exemplary wireless communications device 5 310 includes 2 receive/transmit antennas (receive/transmit antenna 1 346, receive/transmit antenna 2 348). Exemplary wireless communications device P 312 includes 2 receive/transmit antennas (receive/transmit antenna 1 350, receive/transmit antenna 2 352). Some of the wireless communications devices in system 300 include an interface to a backhaul network and/or other network nodes and/or the Internet. In this example, communications device 3 306 and communications device 4 308 include such an interface as indicated by arrows (354, 356), respectively. Some communications devices in the system 300 may have different numbers of antennas. Some of the communications devices in the system may have a different number of receive and transmit antennas. For example, some communications devices may have 1 transmit antenna and two receive antennas. Different symbol streams may be transmitted by different transmit antennas and/or from different RX/TX antennas being used in the TX mode. At least some of the communications devices in system 300 may, and sometimes do, generate estimates of transmitted symbols from one or more other communications devices in the system. At least some of the communications devices in the system 300 implement a method in accordance with flowchart 400 of FIG. 4, e.g., implement a method to operate a linear least squares error filtering module in accordance with flowchart 400 of FIG. 4. At least some of the communications devices in system 300 are implemented such as to reduce non-shift based divisions, e.g., as part of operating a linear lest squares error filtering module.

Figure 4:
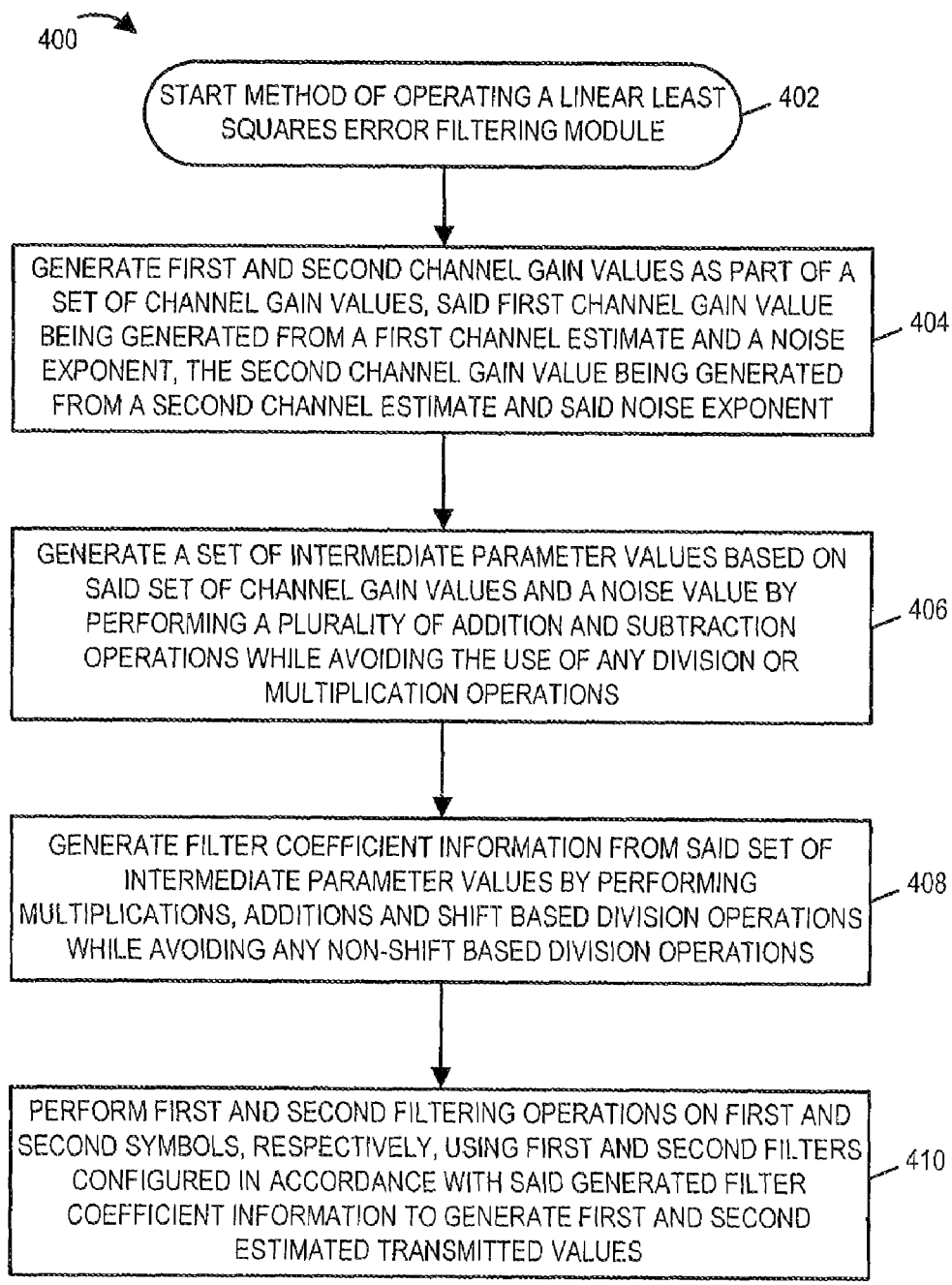
FIG. 4 is flowchart of an exemplary method of operating a linear least squares error (LLSE) filtering module in accordance with an exemplary embodiment.

FIG. 4 is flowchart 400 of an exemplary method of operating a linear least squares error (LLSE) filtering module in accordance with an exemplary embodiment. Operation starts in step 402 where the LLSE filtering module is powered on and initialized and proceeds to step 404.

In step 404 the LLSE filtering module generates first and second channel gain values as part of a set of channel gain values. The first channel gain value is generated from a first channel gain estimate and a noise exponent, and the second channel gain value is generated from a second channel gain estimate and said noise exponent. In some embodiments, generating first and second channel gain values is performed in accordance with the equations: $E_0=\|h_0\|^2>>2m-4$ and $E_1=\|h_1\|^2>>2m-4$, where $E_0$ is a first channel gain value, $E_1$ is a second channel gain value, $h_0$ is a first channel gain estimate, $h_1$ is a second channel gain estimate, m is a noise exponent, and $>>$ represents a shift operation. In various embodiments generating first and second channel gain values is performed without the use of a non-shift based division operation. Operation proceeds from step 404 to step 406.

In step 406 the LLSE filtering module generates a set of intermediate parameter values based on said set of channel gain values and a noise value by performing a plurality of addition and subtraction operations while avoiding the use of any division or multiplication operations. In some embodiments, generating a set of intermediate parameter values is further based on a channel correlation value. In some embodiments, generating a set of intermediate parameter values is performed in accordance with the equations:

$$\alpha_{00}=\hat{\sigma}^2+E_1, \alpha_{10}=-CROSS, \alpha_{01}=\alpha_{10}^*, \text{ and } \alpha_{11}=\hat{\sigma}^2+E_o,$$

and where $CROSS=h_0^H h_1 >> 2m-4$, and where
$\hat{\sigma}^2=\sigma^2>>2m-4$.

In the above equations, the set of channel gain values is the set of $\{E_0, E_1\}$; the set of intermediate parameters are the set $\{\alpha_{00}\alpha_{10}, \alpha_{01}, \text{ and } \alpha_{11}\}$; $h_0$ is a first channel estimate; $h_1$ is a second channel estimate; CROSS is a channel correlation value; $\hat{\sigma}^2$ is a noise value; $\sigma^2$ is a noise variance value; m is a noise exponent; and $>>$ represents a shift operation. Operation proceeds from step 406 to step 408.

In step 408 the LLSE filtering module generates filter coefficient information from said set of intermediate parameter values by performing multiplications, additions and shift based division operations while avoiding any non-shift based division operations. In some embodiments, generating filter coefficient information includes using said first and second channel estimates, said noise exponent and said noise value along with said intermediate parameter values to generate said filter coefficient information. In some embodiments generating filter coefficient information is performed in accordance with the equations:

$$f_0=\alpha_{00}h_0+\alpha_{01}h_1>>m+SHIFT(0)-4, \text{ and } f_1=\alpha_{10}h_0+\alpha_{11}h_1>>m+SHIFT(1)-4.$$

In the above equations, $f_0$ is first filter coefficient information; $f_1$ is second filter coefficient information; the set $\{\alpha_{00}, \alpha_{10}, \alpha_{01}, \alpha_{11}\}$ is a set of intermediate parameter values; $h_0$ is a first channel estimate; $h_1$ is a second channel estimate; m is a noise exponent; SHIFT(0) is a first scaling factor value; SHIFT(1) is a second scaling factor value; and $>>$ represents a shift operation. Operation proceeds from step 408 to step 410.

In step 410 the LLSE filtering module performs first and second filtering operations on and first and second symbols respectively, using first and second filters configured in accordance with said generated filter coefficient information to generate first and second estimated transmitted values. In some embodiments, $Y_0$ and $Y_1$ are first and second symbols, filter coefficient information is $f_0$ and $f_1$; and first and second estimated transmitted values are $\hat{X}_0$ and $\hat{X}_1$ respectively.

In some embodiments, none of steps 404, 406, 408 and 410 include a non-shift based division operation.

Figure 5:
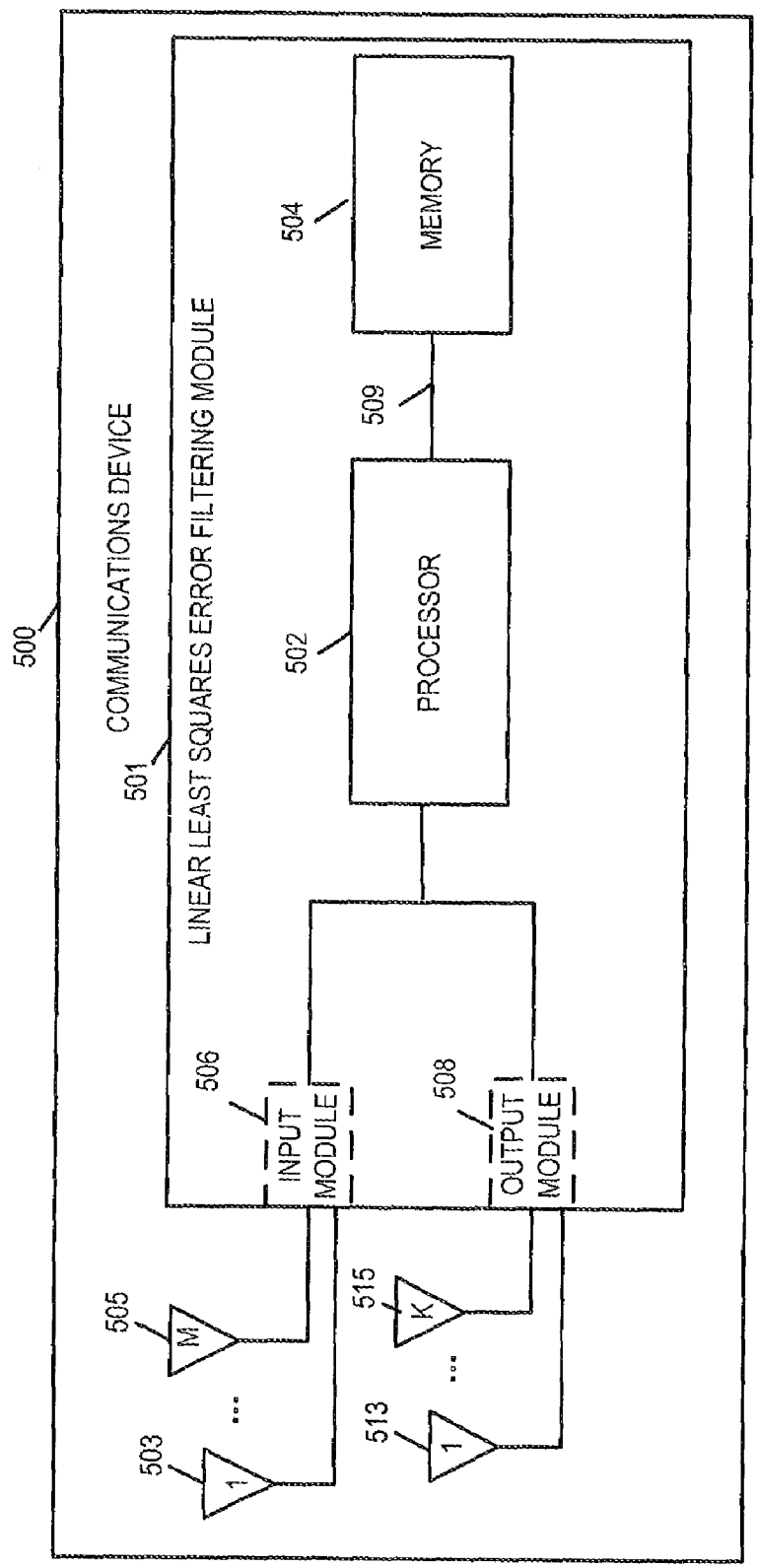
FIG. 5 is a drawing of an exemplary communications device, in accordance with an exemplary embodiment.

FIG. 5 is a drawing of an exemplary communications device 500, in accordance with an exemplary embodiment. Exemplary communications device 500 is, e.g., one of the communications devices of FIG. 3. Exemplary communications device 500 includes a linear least squares error (LLSE) filtering module 501. LLSE filtering module 501 may, and sometimes does, implement a method in accordance with flowchart 400 of FIG. 4.

LLSE filtering module 501 includes a processor 502 and memory 504 coupled together via a bus 509 over which the various elements (502, 504) may interchange data and information. LLSE filtering module 501 further includes an input module 506 and an output module 508 which may be coupled to processor 502 as shown. However, in some embodiments, the input module 506 and output module 508 are located internal to the processor 502. Input module 506 can receive input signals. Input module 506 can, and in some embodiments does, include a wireless receiver and/or a wired or optical input interface for receiving input. Output module 508 may include, and in some embodiments does include, a wireless transmitter and/or a wired or optical output interface for transmitting output. In this example, the input module 506 is coupled to a plurality of receive antennas (receive antenna 1

503, . . . , receive antennas M 505) and the output module 508 is coupled to a plurality of transmit antennas (transmit antenna 1 513, . . . , transmit antennas K 515). In some embodiments, the same one or more antennas are used for both input and output. In some embodiments, two antennas are used for input, and one or more antennas are used for output.

Processor 502 is configured to generate a set of intermediate parameter values based on a set of channel gain values and a noise value by performing a plurality of addition and subtraction operations while avoiding the use of any division or multiplication operations. Processor 502, in some embodiments, as part of being configured to generate a set of intermediate parameter values is further configured to generate said set of intermediate parameter values based on a channel correlation value. Processor 502, in some embodiments, is configured to generate said set of intermediate parameter values in accordance with the equations:

$$\alpha_{00}=\hat{\sigma}^2+E_1, \alpha_{10}=-\text{CROSS}, \alpha_{01}=\alpha_{10}{}^*, \text{and } \alpha_{11}=\hat{\sigma}^2+E_o,$$

$$\text{and where CROSS}=h_0{}^H h_1 >> 2m-4, \text{and where}$$
$$\hat{\sigma}^2=\sigma^2 >> 2m-4.$$

Process 502 is configured to generate filter coefficient information from said set of intermediate parameter values by performing multiplications, additions and shift based division operations while avoiding the use of any non-shift based division operations. Processor 502, in various embodiments, as part of being configured to generate filter coefficient information is configured to generate said filter coefficient information using said first and second channel estimates, said noise exponent, and said noise value along with said intermediate parameter values. Processor 502 is configured, in some embodiments, to generate filter coefficient information in accordance with the equations:

$$f_0=\alpha_{00}h_0+\alpha_{01}h_1>>m+\text{SHIFT}(0)-4, \text{and } f_1=\alpha_{10}h_0+\alpha_{11}h_1>>m+\text{SHIFT}(1)-4.$$

Processor 502 is configured to perform first and second filtering operations on first and second symbols, respectively, using first and second filters configured in accordance with said generated filter coefficient information, to generate first and second estimated transmitted values.

In some embodiments, processor 502 is further configured to: generate first and second channel gain values included in said set of channel gain values, said first channel gain value being generated from a first channel estimate and a noise exponent, the second channel gain value being generated from a second channel estimate and said noise exponent. In various embodiments, processor 502 is configured to generate first and second channel gain values without the use of a non-shift based division operation. Processor 502, in various embodiments, is configured to generate said first and second channel gain values in accordance with the equations:

$$E_0=\|h_0\|^2>>2m-4 \text{ and } E_1=\|h_1\|^2>>2m-4.$$

In some embodiments, none of being configured to generate first and second channel gain values, being configured to generate a set of intermediate values, being configured to generate filter coefficient information and being configured to perform first and second filtering operation include being configured to perform a non-shift based division operation.

Figure 6:
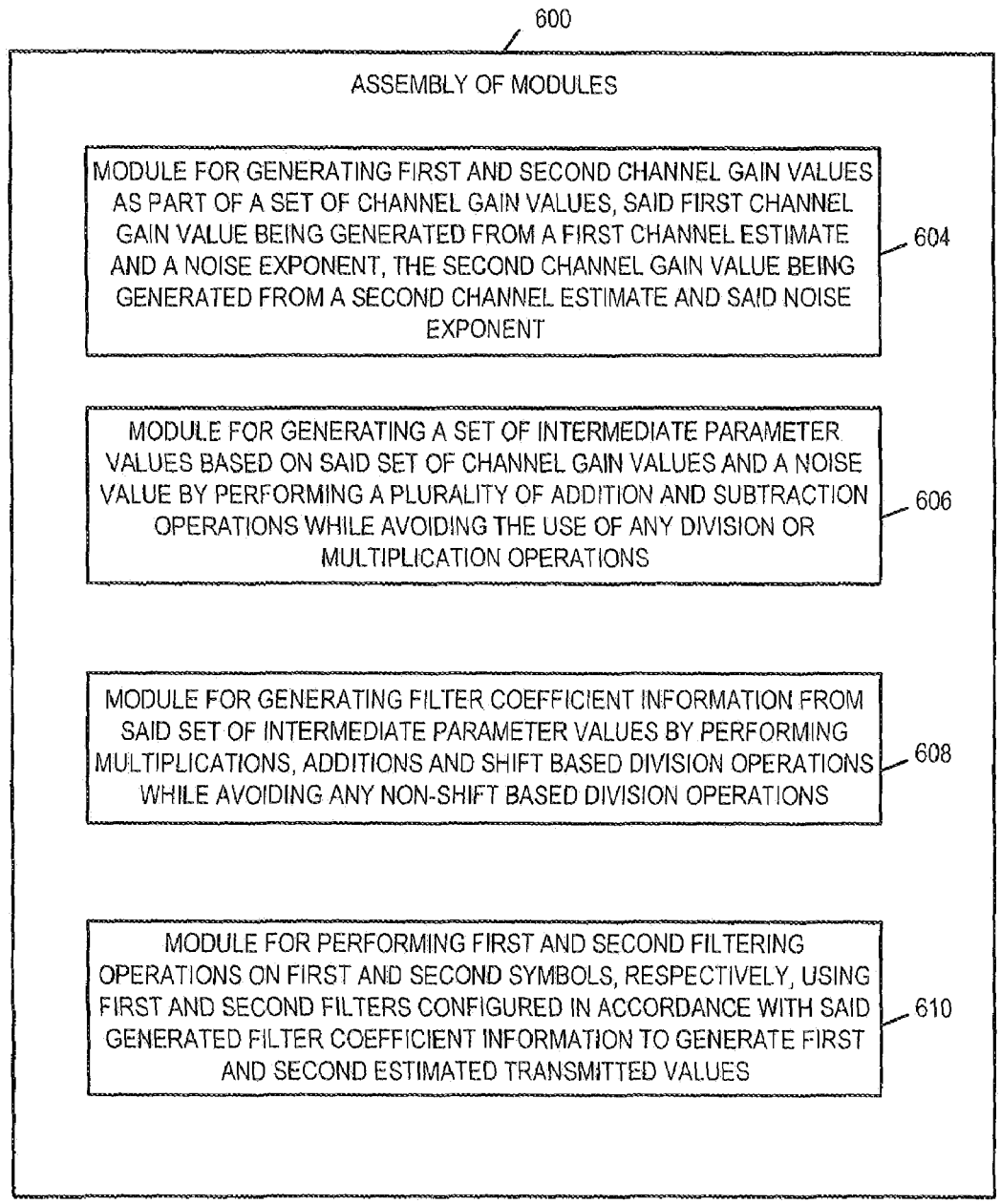
FIG. 6 is an assembly of modules which can, and in some embodiments is, used in the communications module illustrated in the communications device of FIG. 5.

FIG. 6 is an assembly of modules 600 which can, and in some embodiments is, used in the communications device 500 of FIG. 5. The modules in the assembly 600 can be implemented in hardware within the processor 502 of FIG. 5, e.g., as individual circuits. Alternatively, the modules may be implemented in software and stored in the memory 504 of the LLSE filtering module 501 shown in FIG. 5. While shown in the FIG. 5 embodiment as a single processor, e.g., computer, it should be appreciated that the processor 502 may be implemented as one or more processors, e.g., computers. When implemented in software the modules include code, which when executed by the processor, configure the processor, e.g., computer, 502 to implement the function corresponding to the module. In some embodiments, processor 502 is configured to implement each of the modules of the assembly of module 600. In embodiments where the assembly of modules 600 is stored in the memory 504, the memory 504 is a computer program product comprising a computer readable medium comprising code, e.g., individual code for each module, for causing at least one computer, e.g., processor 502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 6 control and/or configure the LLSE filtering module 501 of communications device 500 or elements therein such as the processor 502, to perform the functions of the corresponding steps illustrated in the method flowchart 400 of FIG. 4.

Assembly of modules 600 includes a module 604 for generating first and second channel gain values as part of a set of channel gain values, said first and second channel gain values being generated from a first channel gain estimate and a noise exponent, the second channel gain value being generated from a second channel gain estimate and said noise exponent. In some embodiments, the module 604 for generating first and second channel gain values generates first and second channel gain values without the use of a non-shift based division operation. In some embodiments, the module 604 for generating first and second channel gain values generates said first and second channel gain values in accordance with the equations:

$$E_0=\|h_0\|^2>>2m-4 \text{ and } E_1=\|h_1\|^2>>2m-4.$$

Assembly of modules 600 further includes a module 606 for generating a set of intermediate parameter values based on said set of channel gain values and a noise value by performing a plurality of addition and subtraction operations while avoiding use of division or multiplication operations. In some embodiments, the module for generating a set of intermediate parameter values generates said set of intermediate parameter values based on a channel correlation value. In some embodiments, the module 606 for generating a set of intermediate parameter values generates said set of intermediate values in accordance with the equations:

$$\alpha_{00}=\hat{\sigma}^2+E_1, \alpha_{10}=-\text{CROSS}, \alpha_{01}=\alpha_{10}{}^*, \text{and } \alpha_{11}=\hat{\sigma}^2+E_o,$$

$$\text{and where CROSS}=h_0{}^H h_1 >> 2m-4, \text{and where}$$
$$\hat{\sigma}^2=\sigma^2 >> 2m-4.$$

Assembly of module 600 further includes a module 608 for generating filter coefficient information from said set of intermediate parameter values by performing multiplications, additions and shift based division operations while avoiding any non-shift based division operations. In some embodiments, the module 608 for generating filter coefficient information uses said first and second channel estimates, said noise exponent, and said noise value, along with said intermediate parameter values to generate said filter coefficient information. In various embodiments, the module 608 for generating filter coefficient information generates said filter coefficient information in accordance with the equations:

$$f_0 = \alpha_{00}h_0 + \alpha_{01}h_1 >> m + \text{SHIFT}(0) - 4, \text{and } f_1 = \alpha_{10}h_0 + \alpha_{11}h_1 >> m + \text{SHIFT}(1) - 4.$$

Assembly of modules 600 further includes a module 610 for performing first and second filtering operations on first and second symbols, respectively, using first and second filters configured in accordance with said generated filter coefficient information to generate first and second estimated transmitted value.

In some embodiments, none of: said module 604 for generating first and second channel gain values, said module 606 for generating an intermediate set of parameter values, said module 608 for generating filter coefficient information and said module 610 for performing first and second filtering operation performs a non-shift based division operation.

Figure 7:
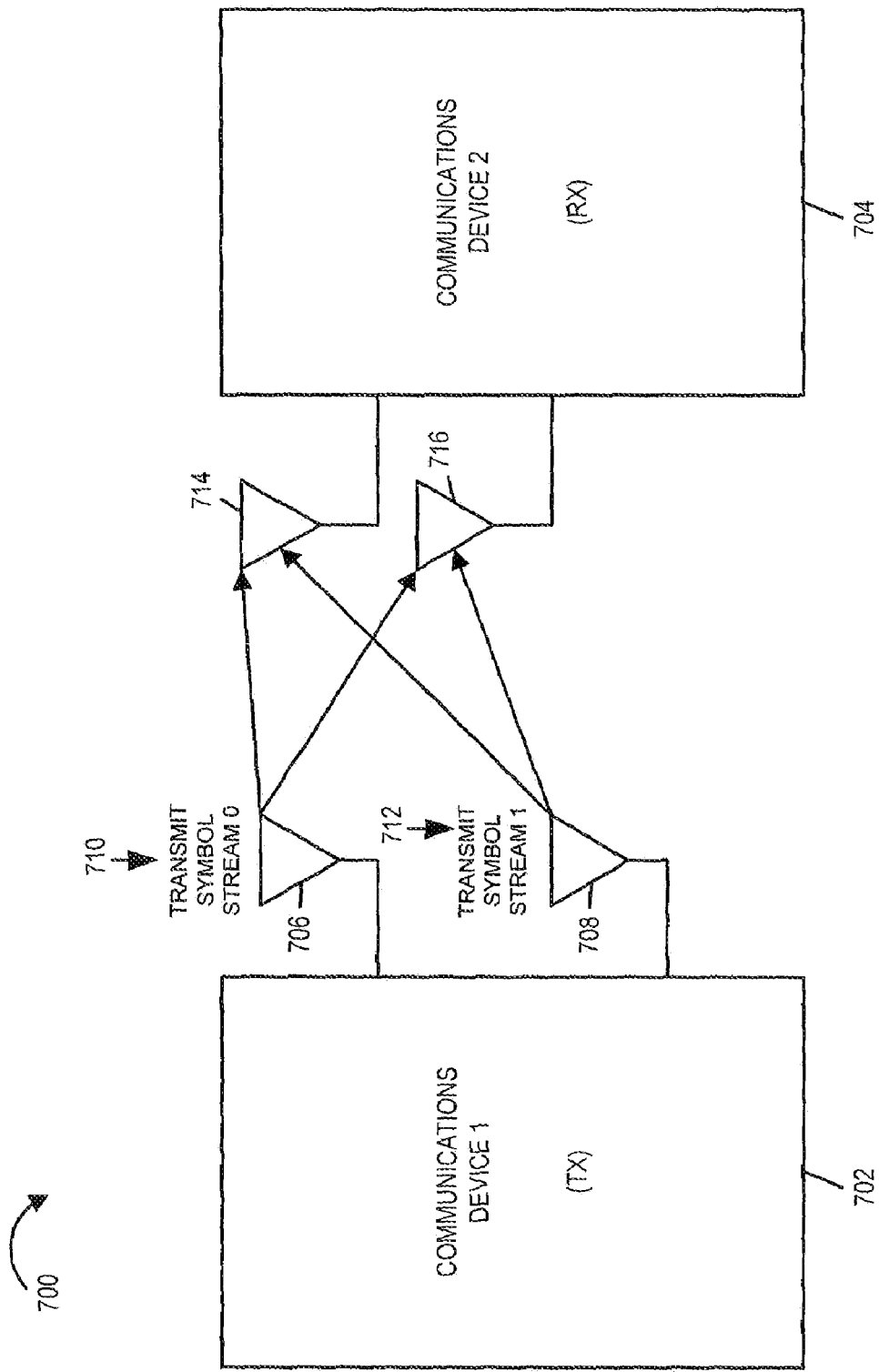
FIG. 7 is a drawing illustrating an exemplary communications device, in accordance with an exemplary embodiment, receiving and processing information corresponding to two different transmit symbol streams transmitted from two different antennas, respectively, of the same transmitter device.

FIG. 7 is a drawing 700 illustrating exemplary first communications device, communications device 1 702, which is functioning as a transmitter device, transmitting signals to exemplary second communications device, communications device 2 704, which is functioning as a receiver device. Communications device 1 702 includes antenna 706 which is transmitting exemplary symbol stream 0 710 and antenna 708 which is transmitting exemplary symbol stream 1 712. Communications device 2 704 includes receive antennas (714, 716), and recovers information communicated by both symbol stream 0 710 and symbol stream 1 712. The communications devices (702, 704) may be any of the exemplary communications devices of system 300 of FIG. 3. Communications device 2 704 is, e.g., a communications device which performs a method in accordance with flowchart 400 of FIG. 4 and/or is implemented in accordance with FIG. 5 and FIG. 6.

Figure 8:
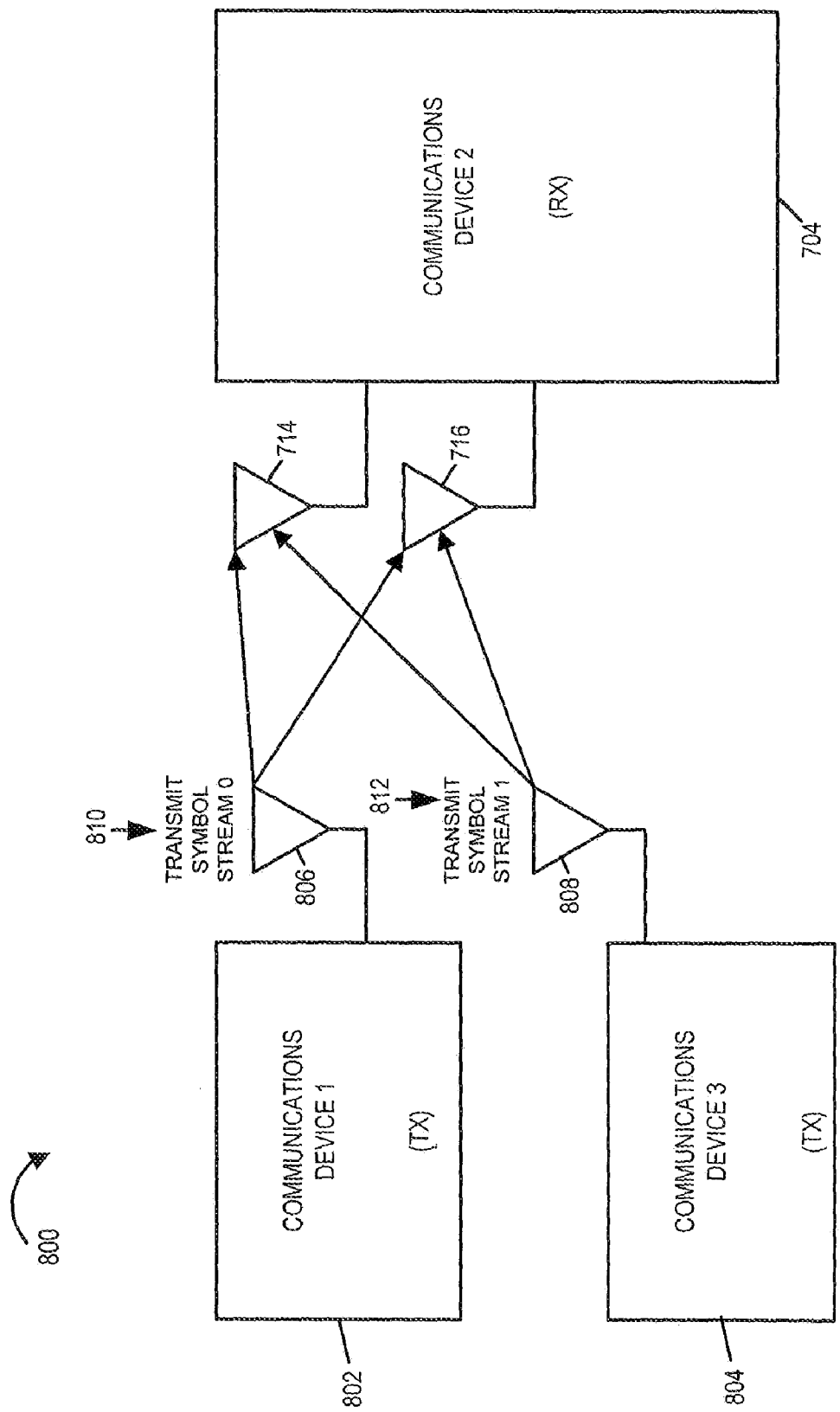
FIG. 8 is a drawing illustrating an exemplary communications device, in accordance with an exemplary embodiment, receiving and processing information corresponding to two different transmit symbol streams transmitted from two different antennas, respectively, the two different transmit antennas corresponding to different transmit devices.

FIG. 8 is a drawing 800 illustrating exemplary first communications device, communications device 1 802, which is functioning as a transmitter device, transmitting signals to exemplary second communications device, communications device 2 704, which is functioning as a receiver device. Drawing 800 also illustrates exemplary third communications device, communications device 3 804, which is functioning as a transmitter device, transmitting signals to exemplary second communications device, communications device 2 704, which is functioning as a receiver device. Communications device 1 802 includes antenna 806 which is transmitting exemplary symbol stream 0 810. Communications device 3 804 includes antenna 808 which is transmitting exemplary symbol stream 1 812. Communications device 2 704 includes receive antennas (714, 716), and recovers information communicated by both symbol stream 0 810 and symbol stream 1 812. The communications devices (802, 704, 804) may be any of the exemplary communications devices of system 300 of FIG. 3. Communications device 2 704 is, e.g., a communications device which performs a method in accordance with flowchart 400 of FIG. 4 and/or is implemented in accordance with FIG. 5 and FIG. 6.

Figure 9:
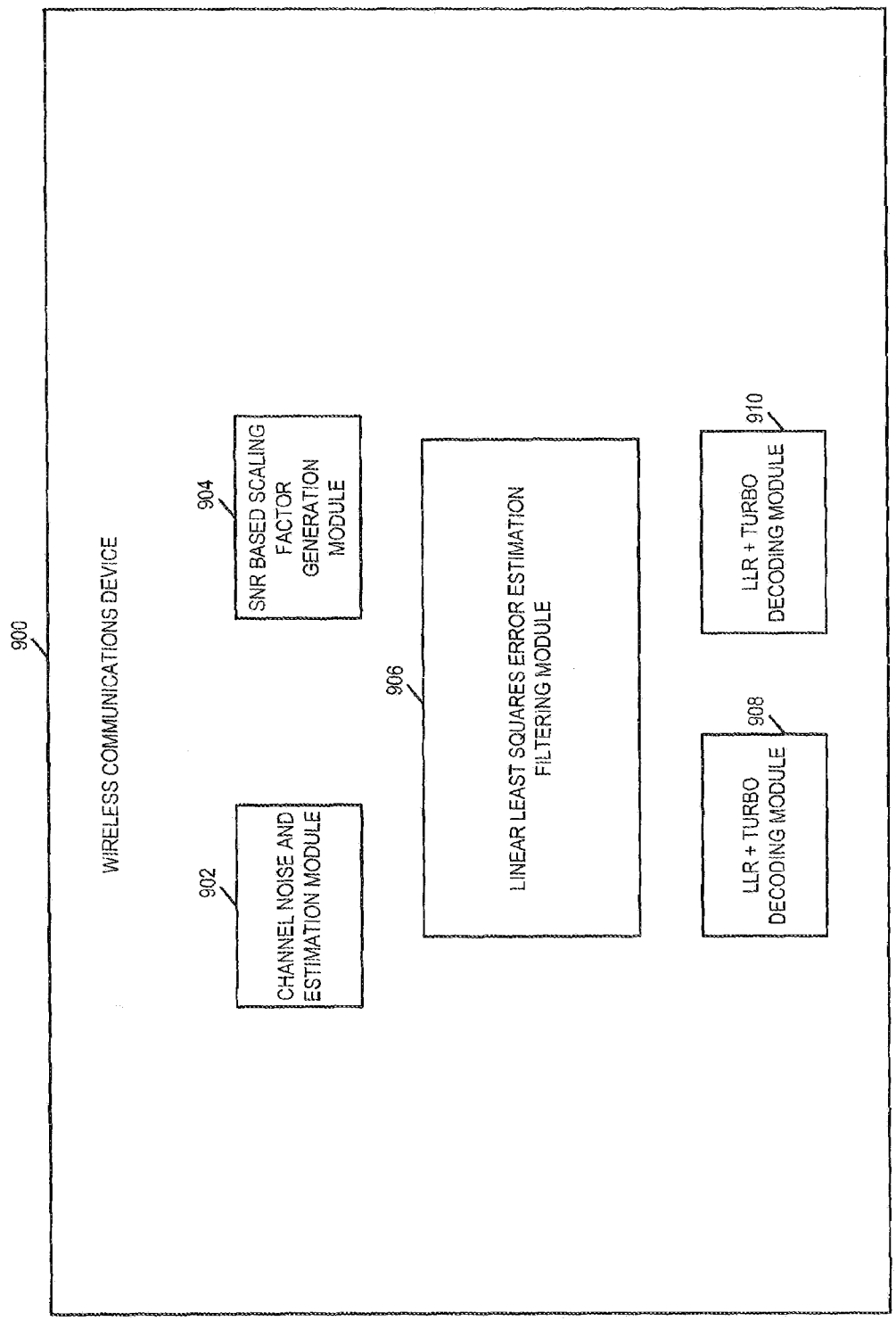
FIG. 9 is a drawing of an exemplary wireless communications device implemented in accordance with an exemplary embodiment.

FIG. 9 is a drawing of an exemplary wireless communications device 900 implemented in accordance with an exemplary embodiment. Exemplary wireless communications device 900 is, e.g., exemplary wireless communications device 704 of FIG. 7 or FIG. 8. Wireless communications device 900 includes a channel and noise estimation module 902, an SNR based scaling factor generation module 904, a linear least squares error estimation filtering module 906, a first log-likelihood ratio (LLR) plus turbo decoding module 908 and a second LLR plus turbo decoding module 910.

Figure 10:
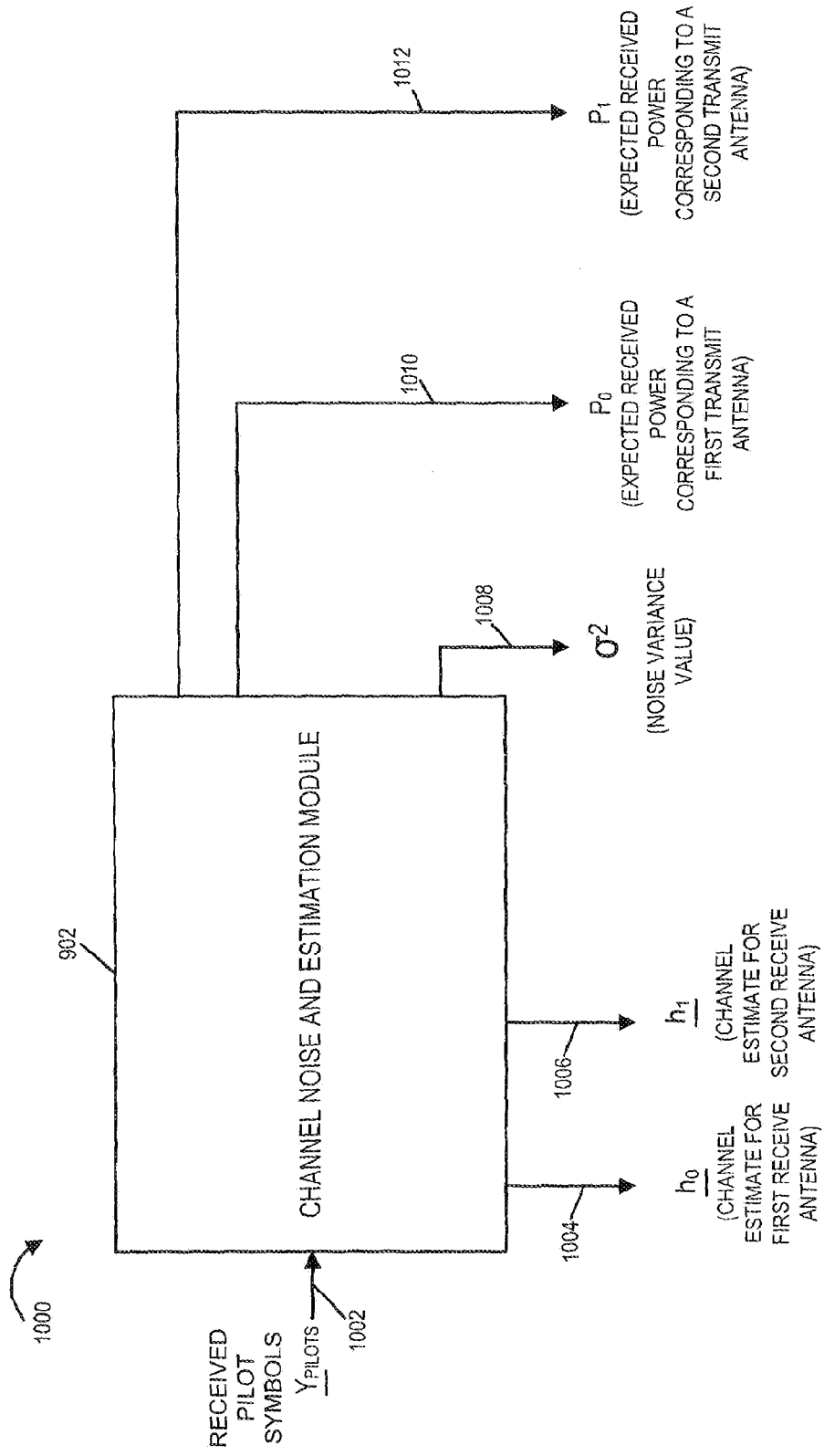
FIG. 10 is a drawing illustrating an exemplary channel noise and estimation module which is included as part of wireless communications device of FIG. 9, in accordance with an exemplary embodiment.

FIG. 10 is a drawing 1000 illustrating exemplary channel noise and estimation module 902 which is included as part of wireless communications device 900 of FIG. 9, in accordance with an exemplary embodiment. Drawing 1000 illustrates exemplary inputs and outputs of channel and noise estimation module 902. In the example of FIG. 10 consider that the channel noise and estimation module 902 is processing received pilot signals so that channel and noise estimation information can be determined which is to be used to recover two transmit data symbols streams from two transmit antennas, e.g., as shown in the example of FIG. 7 or FIG. 8. Channel noise and estimation module 902 receives received pilots symbols as represented by pilot vector $Y_{pilots}$ 1002 which includes received pilot symbols corresponding to transmit a first transmit antenna and a second transmit antenna. The channel noise and estimation module 902 processes the received pilot symbols 1002 and generates as outputs: noise variance value $\sigma^2$ 1008, an expected received power corresponding to the first transmit antenna $P_0$ 1010, and an expected received power corresponding to the second transmit antenna $P_1$ 1012. Channel noise and estimation module 902 also generates and outputs: a channel estimate for a first receive antenna which is estimate $h_0$ 1004 and a channel estimate for a second receive antenna which is estimate $h_1$ 1006.

Figure 11:
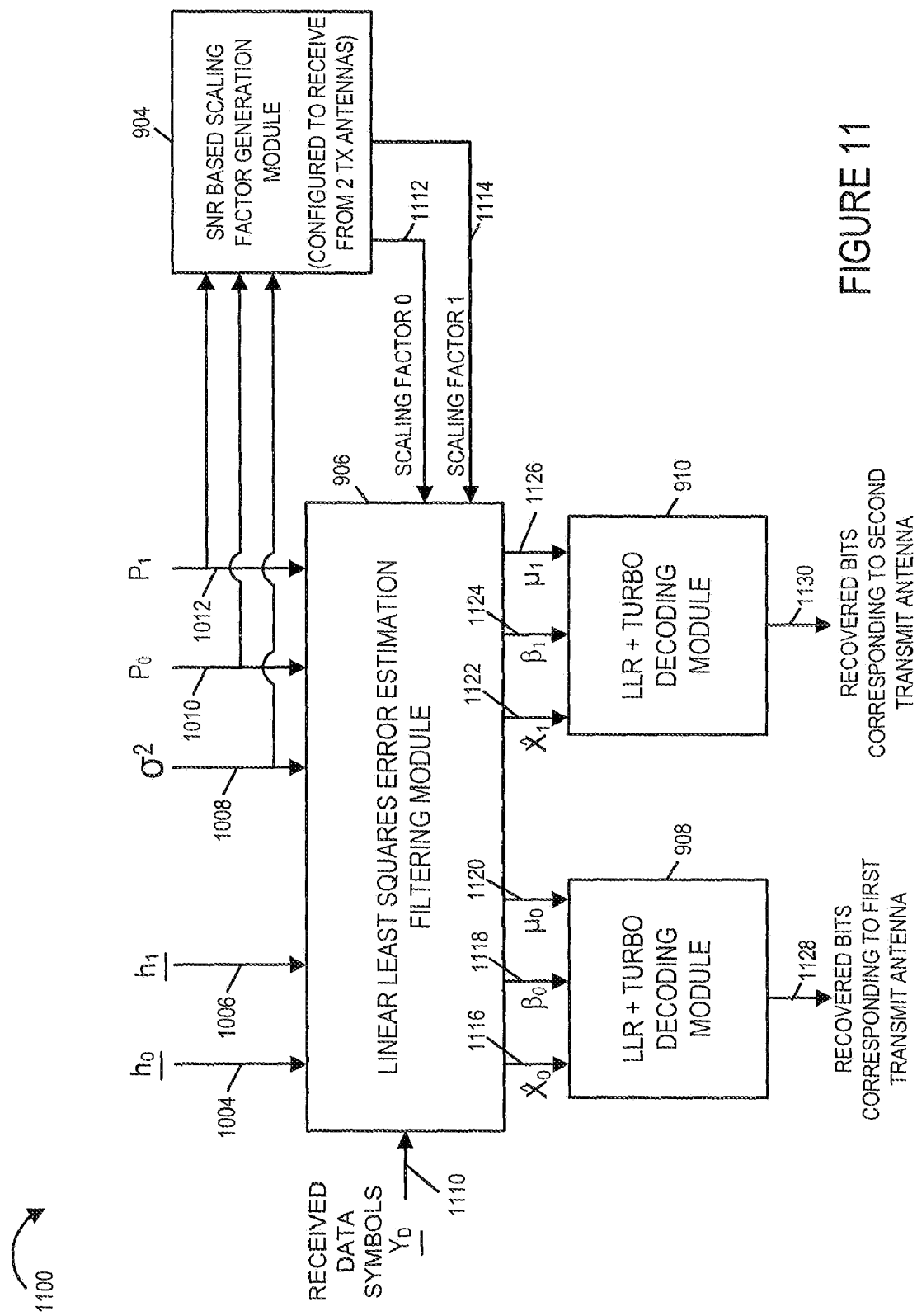
FIG. 11 is a drawing illustrating an exemplary linear least squares error estimation filtering module, an exemplary SNR based scaling factor generation module, a first log-likelihood ratio (LLR) plus turbo decoding module, and a second LLR plus turbo decoding module, which are included as part of the exemplary communications device of FIG. 9, in accordance with an exemplary embodiment.

FIG. 11 is a drawing 1100 illustrating an exemplary linear least squares error estimation filtering module 906, exemplary SNR based scaling factor generation module 904, first log-likelihood ratio (LLR)+turbo decoding module 908, and second LLR+turbo decoding module 910, which is included as part of communications device 900 of FIG. 9, in accordance with an exemplary embodiment. In some other embodiments, an alternative decoding approach to turbo decoding may be used. In the example of FIG. 9 consider that the communications device is configured to recover two transmit data symbols streams from two transmit antennas, e.g., as shown in the example of FIG. 7 or FIG. 8.

SNR based scaling factor generation module 904, which is configured to support reception from 2 transmit antennas, receives as input noise variance value $\sigma^2$ 1008, expected received power corresponding to a first transmit antenna $P_0$ 1010 and expected received power corresponding to a second transmit antenna $P_1$ 1012. SNR based scaling factor generation module 904 generates two scaling factors (scaling factor 0 1112 which is SHIFT(0) and scaling factor 1 1114 which is SHIFT(1)) which are output to linear least squares error estimation filtering module 906. Scaling factor 0 1112 corresponds to the first transmit antenna and is used to scale values related to the processing and/or recovery of symbol stream 0 information to try to avoid overflow and/or underflow conditions. Scaling factor 1 1114 corresponds to the second transmit antenna and is used to scale values related to the processing and/or recovery of symbol stream 1 information to try to avoid overflow and/or underflow conditions. In some other embodiments, the scaling factors (1112, 1114) are generated by another type of scaling factor generation module, e.g., the scaling factor generation need not be SNR based. In some embodiments, the scaling factors (1112, 1114) are predetermined values.

Linear least squares error estimation filtering module 906 receives as input: scaling factor 0 1112, scaling factor 1 1114, channel estimates (estimate $h_0$ 1004 for a first receive antenna, estimate $h_1$ 1006 for a second receive antenna) noise variance $\sigma^2$ 1008, expected received power corresponding to the first transmit antenna $P_0$ 1010, and expected received power corresponding to the second transmit antenna $P_1$ 1012. In addition, the linear least squares error estimation filtering module 906 receives as input received data symbols corresponding to the two transmit antennas as indicated by the vector $Y_D$ 1110 which are to be processed.

Linear least squares error estimation filtering module 906, performs processing including using scaling factor 0 1112, and generates outputs corresponding to the first transmit antenna. The outputs include: an estimate of a transmitted symbol from the first transmit antenna, estimate $\hat{X}_0$ 1116, a first gain slicing parameter $\beta_0$ 1118, and a first variance slicing parameter $\mu_0$ 1120. The outputs (1116, 1118, 1120) are used as inputs to the LLR+turbo decoding module 908 which recovers bits corresponding to the first transmit antenna 1128.

Linear least squares error estimation filtering module 906, performs processing including using scaling factor 1 1114, and generates outputs corresponding to the second transmit antenna. The outputs include: an estimate of a transmitted symbol from the second transmit antenna, estimate $\hat{X}_1$ 1222, a second gain slicing parameter $\beta_1$ 1124, and a second variance slicing parameter $\mu_1$ 1126. The outputs (1122, 1124, 1126) are used as inputs to the LLR+turbo decoding module 910 which recovers bits corresponding to the second transmit antenna 1130.

In some embodiments, the channel estimate occurs once per transmission block or transmission segment. In some such embodiments, the SNR changes very slowly, e.g., over multiple data transmission blocks, and can remain static over a relatively long amount of time. Thus, in such an embodiment, the SNR changes at a lower rate than the channel estimation rate changes. In some embodiments, a set of scaling factors are determined, e.g., selected, as a function of a set of SNRs, and remain in use by the LLSE estimation filtering module 906 for a relatively long amount of time, e.g., for multiple data transmission blocks. In comparison, the LLSE processing, which utilizes the channel estimates and determined scaling factors, is done on a per symbol basis.

Figure 12:
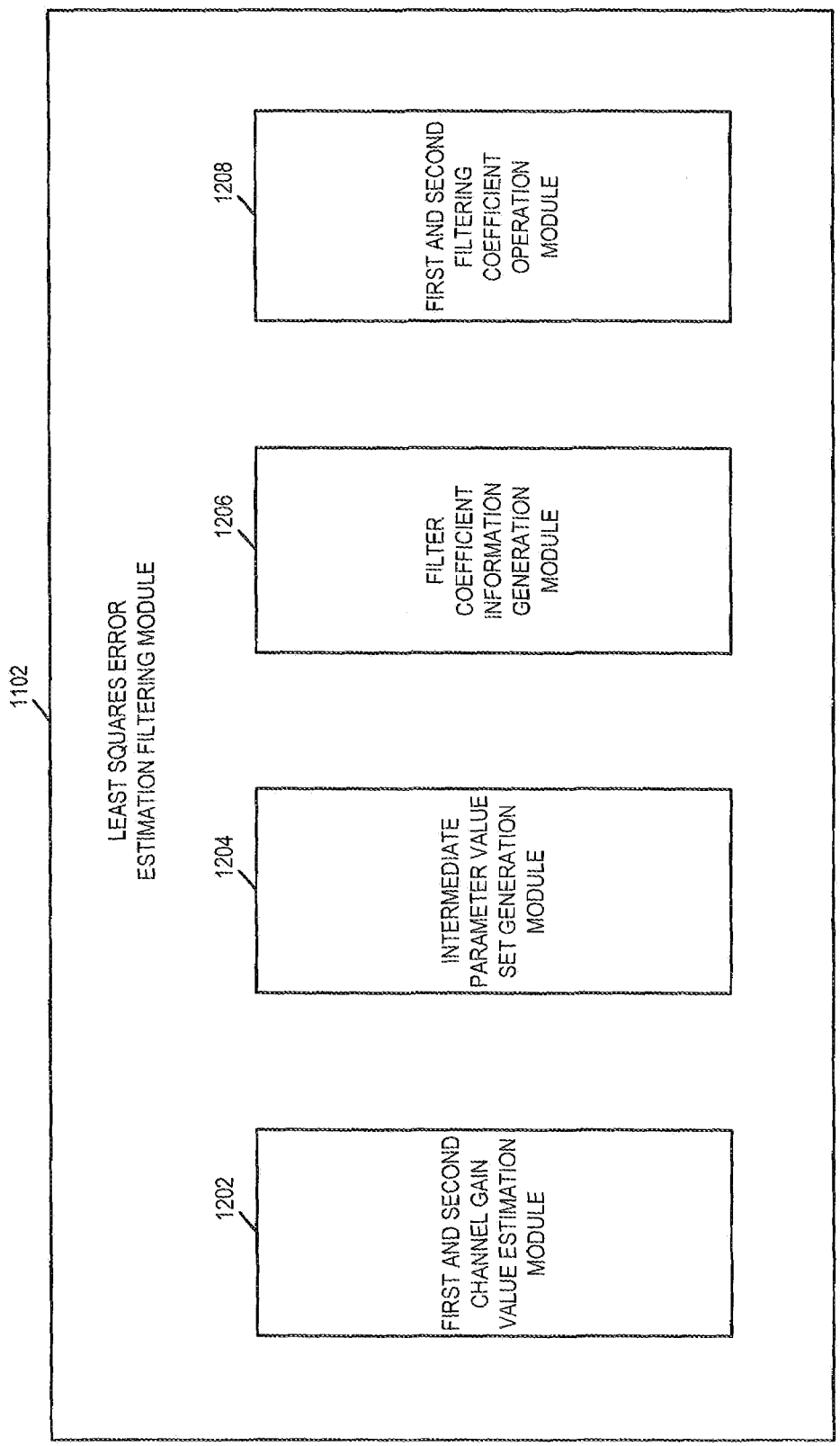
FIG. 12 is a drawing of a more detailed representation of one embodiment of exemplary least squares error estimation filtering module of the exemplary wireless communications device of FIG. 9.

FIG. 12 is a drawing of a more detailed representation of one embodiment of exemplary least squares error estimation filtering module 906 of wireless communications device 900 of FIG. 9. Linear least squares error estimation filtering module 906 includes first and second channel gain value estimation module 1202, intermediate parameter value set generation module 1204, filter coefficient information generation module 1206 and first and second filtering coefficient operation module 1208, which are coupled together and exchange data and information. In one exemplary embodiment linear least squares error estimation filtering module 906 is linear least squares error filtering module 501 of FIG. 5, and modules (1202, 1204, 1206, 1208) of FIG. 12 are modules (604, 606, 608, 610), respectively of FIG. 6.

Figure 13:
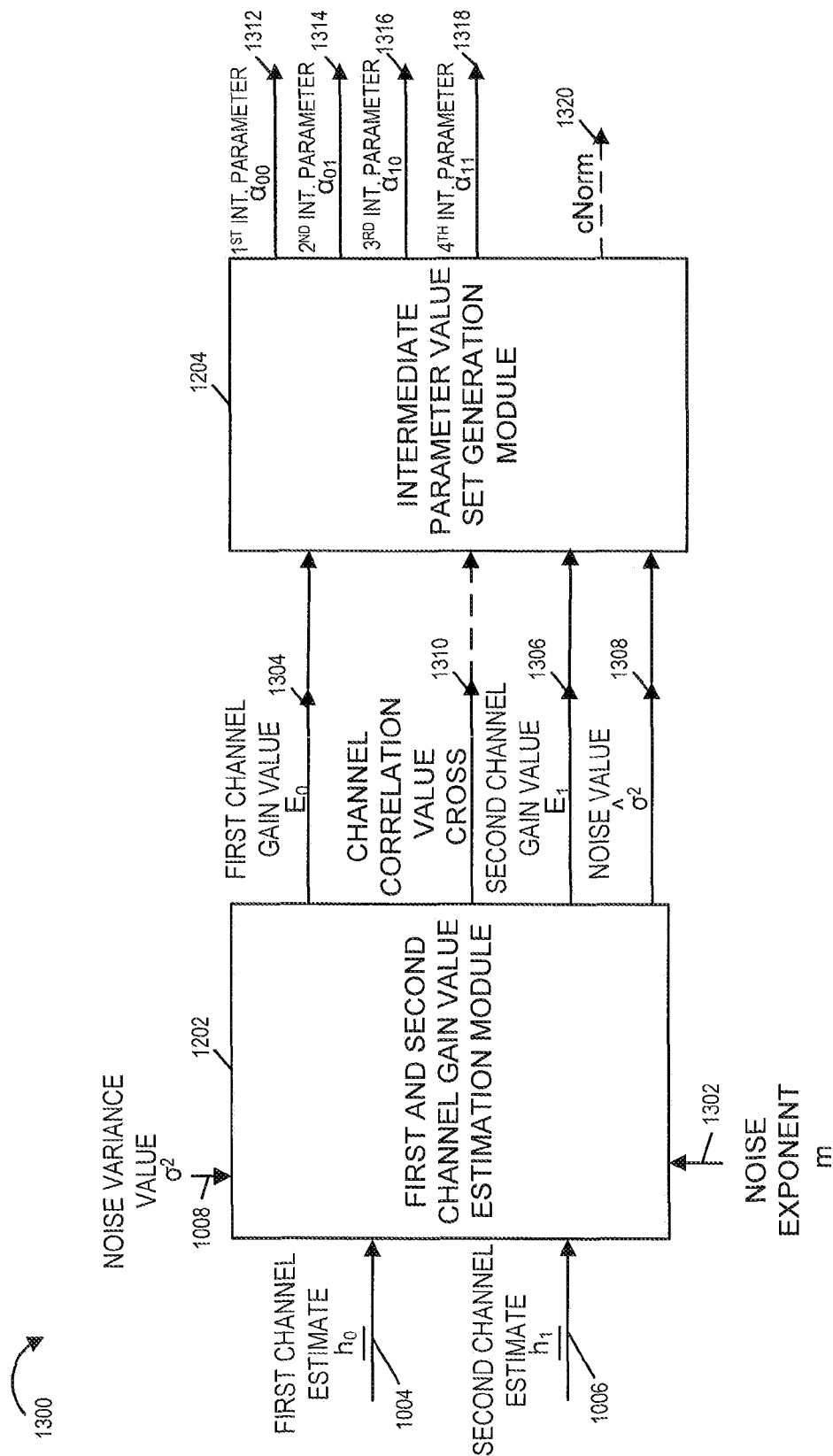
FIG. 13 is a drawing illustrating an exemplary first and second channel gain value estimation module, an intermediate parameter value generation module, and various input and output signaling associated with the modules.

FIG. 13 is a drawing 1300 illustrating first and second channel gain value estimation module 1202, intermediate parameter value generation module 1204, and various input and output signaling associated with the modules (1202, 1204). Inputs to channel gain estimation module 1202 include noise variance value $\sigma^2$ 1008, first channel estimate $h_0$ 1004, second channel estimate $h_1$ 1006 and noise exponent m 1302. In some embodiments, m is approximately $\log_2 \sigma$. Outputs for channel gain value estimation module 1202 include first channel gain value $E_0$ 1304, second channel gain value $E_1$ 1306, estimated noise value $\hat{\sigma}^2$ 1308, and channel correlation value CROSS 1310. First and second channel gain estimation module 1202 generates first and second channel gain values ($E_0$ 1304, $E_1$ 1306) which are included in a set of channel gain values. The first channel gain value $E_0$ 1304 is generated from the first channel estimate $h_0$ 1004 and noise exponent m 1302; the second channel gain value $E_1$ 1306 is generated from the second channel estimate $h_1$ 1006 and noise exponent m 1302.

In some embodiments, channel gain value estimation module 1202 generates the first and second channel gain values ($E_0$ 1304, $E_1$ 1306) without the use of a non-shift based division operation. In some embodiments, module 1202 generates first and second channel gain estimates ($E_0$ 1304, $E_1$ 1306) in accordance with the equations: $E_0 = \|h_0\|^2 >> 2m-4$ and $E_1 = \|h_1\|^2 >> 2m-4$, where $>>$ represents a shift operation. In some embodiments module 1202 generates the channel correlation value CROSS 1310 in accordance with the equation CROSS$= h_0^H h_1 >> 2m-4$. In some embodiments, module 1202 generates the estimated noise value $\hat{\sigma}^2$ 1308 in accordance with the equation $\hat{\sigma}^2 = \sigma^2 >> 2m-4$.

Inputs to intermediate parameter set generation module 1204 include first channel gain value $E_0$ 1304, second channel gain value $E_1$ 1306, noise value $\hat{\sigma}^2$ 1308, while outputs from module 1204 include a set of intermediate parameter values (1st intermediate parameter $\alpha_{00}$ 1312, 2nd intermediate parameter value $\alpha_{01}$ 1314, 3rd intermediate parameter value $\alpha^{10}$ 1316, 4th intermediate parameter value $\alpha_{11}$ 1318). In some embodiments, channel correlation value CROSS 1310 is an input to intermediate parameter set generation module 1204 and value cNorm 1320 is an output of module 1204. Intermediate parameter value set generation module 1204 generates a set of intermediate parameter values ($\alpha_{00}$ 1312, $\alpha_{01}$ 1314, $\alpha_{10}$ 1316, $\alpha_{11}$ 1318) based on a set of channel gain values ($E_0$ 1304, $E_1$ 1306), and a noise value $\hat{\sigma}^2$ 1308 by performing a plurality of addition and subtraction operations while avoiding the use of any division or multiplication operations. In some embodiments, intermediate parameter value set generation module 1204 in generating the set of intermediate parameter values ($\alpha_{00}$ 1312, $\alpha_{01}$ 1314, $\alpha_{10}$ 1316, $\alpha_{11}$ 1318) further bases the generation on channel correlation value CROSS 1310.

In one exemplary embodiment, intermediate parameter value set generation module 1204 generates the set of intermediate parameter values ($\alpha_{00}$ 1312, $\alpha_{01}$ 1314, $\alpha_{10}$ 1316, $\alpha_{11}$ 1318) in accordance with the equations:

$$\alpha_{00} = \hat{\sigma}^2 + E_1, \alpha_{10} = -\text{CROSS}, \alpha_{01} = \alpha_{10}^*, \text{and } \alpha_{11} = \hat{\sigma}^2 + E_o.$$

In some embodiments, module 1204 generates value cNorm 1320 in accordance with the equation: cNorm$=|\text{CROSS}|^2$.

Figure 14:
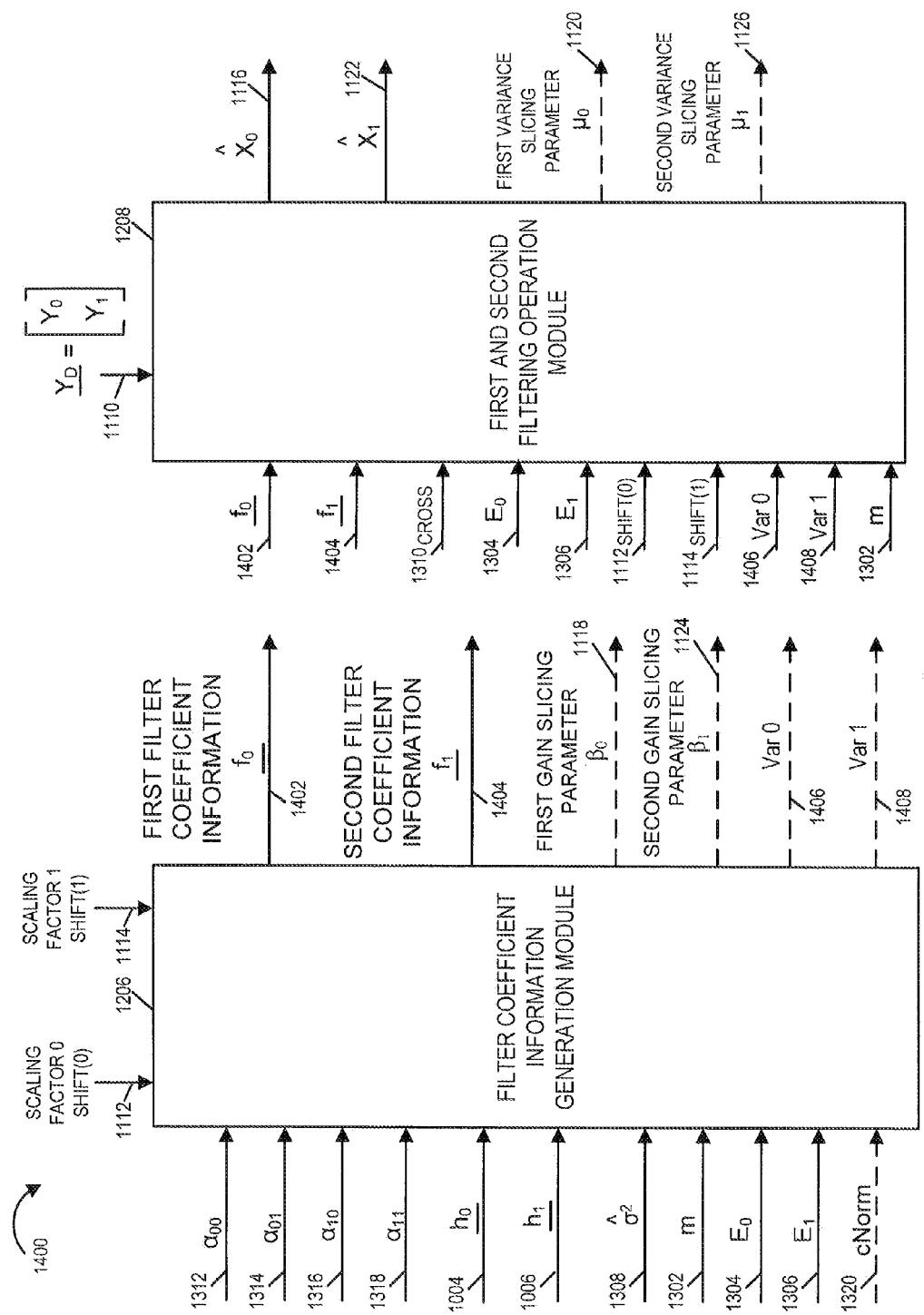
FIG. 14 is a drawing illustrating an exemplary filter coefficient information generation module, an exemplary first and second filtering operation module, and various input and output signaling associated with the modules.

FIG. 14 is a drawing 1400 illustrating filter coefficient information generation module 1206, first and second filtering operation module 1208, and various input and output signaling associated with the modules (1206, 1208). Inputs to filter coefficient information generation module 1206 include the set of intermediate parameter values ($\alpha_{00}$ 1312, $\alpha_{01}$ 1314, $\alpha_{10}$ 1316, $\alpha_{11}$ 1318), first channel estimate $h_0$ 1004, second channel estimate $h_1$ 1006, noise value $\hat{\sigma}^2$ 1308, noise exponent m 1302, the set of channel gain values ($E_0$ 1304, $E_1$ 1306), cNorm 1320, scaling factor 0 SHIFT(0) 1112, and scaling factor 1 SHIFT(1) 1114. Outputs of filter coefficient information generation module 1206 include first filter coefficient information $f_0$ 1402 and second filter coefficient information $f_1$ 1404. In some embodiments, outputs of module 1206 also include a first gain slicing parameter $\beta_0$ 1118, a second gain slicing parameter $\beta_1$ 1124, a first variance value Var 0 1406 and a second variance value Var 1 1408. Filter coefficient information generation module 1206 generates filter coefficient information ($f_0$ 1402, $f_1$ 1404) from the set of intermediate parameter values ($\alpha_{00}$ 1312, $\alpha_{01}$ 1314, $\alpha_{10}$ 1316, $\alpha_{11}$ 1318) by performing multiplications, additions and shift based division operations while avoiding use of any non-shift based division operations. In various embodiments, module 1206 uses first and second channel estimates ($h_0$ 1004, $h_1$ 1006), noise exponent m 1302, and said noise value $\hat{\sigma}^2$ 1308 along with said intermediate parameter values ($\alpha_{00}$ 1312, $\alpha_{01}$ 1314, $\alpha_{10}$ 1316, $\alpha_{11}$ 1318) to generate the filter coefficient information ($f_0$ 1402, $f_1$ 1404). In some embodiments, module 1206 generates filter coefficient information ($f_0$ 1402, $f_1$ 1404) in accordance with the equations:

$$f_0 = \alpha_{00} h_0 + \alpha_{01} h_1 >> m + \text{SHIFT}(0) - 4, \text{and } f_1 = \alpha_{10} h_0 + \alpha_{11} h_1 >> m + \text{SHIFT}(1) - 4.$$

In some embodiments, module 1206 generates first and second slicing parameters ($\beta_0$ 1118, $\beta_1$ 1124) in accordance with the equations:

$$\beta_0 = \alpha_{11} E_0 - \text{cNorm} >> \text{SHIFT}(0)$$

and $$\beta_1 = \alpha_{00} E_1 - \text{cNorm} >> \text{SHIFT}(1)$$

In some embodiments, module 1206 generates variance values (Var 0 1406, Var 1 1408) in accordance with the equations:

$$\text{Var0} = \|f_0\|^2 \hat{\sigma}^2 >> 4$$

and $$\text{Var1} = \|f_1\|^2 \hat{\sigma}^2 >> 4$$

First and second filtering operation module 1208 includes inputs $Y_D$ 1110 which includes a first symbol $Y_0$ and a second symbol $Y_1$, first filter coefficient information $f_0$ 1402, second filter coefficient information $f_1$ 1404, channel correlation value CROSS 1310, first channel gain value $E_0$ 1304, second channel gain value $E_1$ 1306, scaling factor 0 SHIFT(0) 1112, scaling factor 1 SHIFT(1) 1114, Var 0 1406, Var 1 1408, and noise exponent m 1302. Outputs of first and second filtering operation module 1208 include first estimated transmitted value $\hat{X}_0$ 1116 and second estimated transmitted value $\hat{X}_1$ 1122. In some embodiments, outputs of module 1208 also include a first variance slicing parameter $\mu_0$ 1120 and a second variance slicing parameter $\mu_1$ 1126. First and second filtering operation module 1208 performs filtering operations on first and second symbols ($Y_0$, $Y_1$), respectively, using first and second filters configured in accordance with the generated filter coefficient information ($f_0$ 1402, $f_1$ 1404), to generate first and second transmitted values ($\hat{X}_0$ 1116, $\hat{X}_1$ 1122).

In some embodiments, module 1208 generates first and second estimated transmitted values ($\hat{X}_0$ 1116, $\hat{X}_1$ 1122) in accordance with the equations:

$$\hat{X}_0 = f_0 Y_D >> m$$

and $$\hat{X}_1 = f_1 Y_D >> m$$

In some embodiments, module 1208 generates first and second variance slicing parameters in accordance with the equations:

$$\mu_o = |(\alpha_{00} \text{CROSS} + \alpha_{01} E_1) >> \text{SHIFT}(0)|^2 + \text{Var0}$$

and $$\mu_1 = |(\alpha_{11}(\text{CROSS})^* + \alpha^*_{10} E_0) >> \text{SHIFT}(1)|^2 + \text{Var1}.$$

In some embodiments none of the first and second channel gain estimation module 1202, intermediate parameter value set generation module 1204, filter coefficient information generation module 1206 and first and second filtering operation module 1208 perform a non-shift based division operation.

The techniques of various embodiments may be implemented using software, hardware and/or a combination of software and hardware. Various embodiments are directed to apparatus, e.g., wireless communications devices including, e.g., access terminals such as wireless mobile nodes and wireless stationary nodes, and access points such as base stations. Some embodiments are directed to wireless communications systems. Various embodiments are also directed to methods, e.g., method of controlling and/or operating wireless communications devices including access terminals such as mobile nodes and stationary nodes, and access points such as base stations, and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. Various features are directed to novel messages and/or the use of novel messages. The messages are generated, stored and/or communicated. As part of the communications processes one or more of the messages are stored prior to transmission and stored upon receipt. Thus, some features are directed to a memory device, e.g., computer readable medium, having stored thereon one or more of the messages described in the present application. In many cases the messages provide efficiency in terms of their data structure and/or other benefits, over other message formats which might be used, such as the ability to easily identify and access some information in the message.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, generating a set of intermediate parameter values, based on a set of channel gain values and a noise value, by performing a plurality of addition and subtraction operations while avoiding the use of any division or multiplication operations; generating filter coefficient information from said set of intermediate parameter values by performing multiplications, additions and shift based division operations while avoiding the use of any non-shift based division operations; and performing first and second filtering operations on first and second symbols, respectively, using first and second filters configured in accordance with said generated filter coefficient information, to generate first and second estimated transmitted values, etc. Thus, in some embodiments, various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention. In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and method steps described in connection with the embodiments disclosed herein may be, and in some embodiments are, implemented as electronic hardware, computer software, and/or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processor may, and in some embodiments, is a computer.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal or access point. In the alternative, the processor and the storage medium may reside as discrete components in a user terminal or access point.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of operating a linear least squares error (LLSE) filtering module, the method comprising:
  generating a set of intermediate parameter values, based on
    a set of channel gain values and a noise value, by performing a plurality of addition and subtraction operations with at least reduced use of division or multiplication operations;

generating filter coefficient information from said set of intermediate parameter values by performing multiplications, additions and shift based division operations with at least reduced use of non-shift based division operations; and performing first and second filtering operations on first and second symbols, respectively, using first and second filters configured in accordance with said generated filter coefficient information, to generate first and second estimated transmitted values.

2. The method of claim 1, further comprising:

generating first and second channel gain values included in said set of channel gain values, said first channel gain value being generated from a first channel estimate and a noise exponent, the second channel gain value being generated from a second channel estimate and said noise exponent.

3. The method of claim 2, wherein said generating first and second channel gain values is performed without the use of a non-shift based division operation.

4. The method of claim 2, wherein said generating a set of intermediate parameter values is further based on a channel correlation value.

5. The method of claim 2, wherein said generating filter coefficient information includes using said first and second channel estimates, said noise exponent, and said noise value along with said intermediate parameter values to generate said filter coefficient information.

6. The method of claim 1, wherein said generating a set of intermediate parameter values is performed in accordance with the equations:

$$\alpha_{00}=\hat{\sigma}^2+E_1, \alpha_{10}=-CROSS, \alpha_{01}=\alpha_{10}{}^*, \text{and } \alpha_{11}=\hat{\sigma}^2+E_o,$$

and where $CROSS=h_0{}^H h_1 >> 2m-4$, and where
$\hat{\sigma}^2 = \sigma^2 >> 2m-4$, where $\{E_0, E_1\}$ is said set of channel gain values, where $\{\alpha_{00}, \alpha_{10}, \alpha_{01}, \text{and } \alpha_{11}\}$ is said set of intermediate values, where CROSS is a channel correlation value, where $\hat{\sigma}^2$ is said noise value, where $\sigma^2$ is a noise variance value, m is a noise exponent, and where $>>$ represents a shift operation.

7. The method of claim 2, wherein said generating first and second channel gain values is performed in accordance with the equations:

$$E_0 = \|h_0\|^2 >> 2m-4 \text{ and } E_1 = \|h_1\|^2 >> 2m-4,$$

where $\{E_0, E_1\}$ is said set of channel gain values, where $h_0$ is a first channel estimate, where $h_1$ is a second channel estimate, where m is a noise exponent, and where $>>$ represents a shift operation.

8. The method of claim 1, wherein said generating filter coefficient information is performed in accordance with the equations:

$$f_0 = \alpha_{00} h_0 + \alpha_{01} h_1 >> m+SHIFT(0)-4, \text{ and } f_1 = \alpha_{10} h_0 + \alpha_{11} h_1 >> m+SHIFT(1)-4,$$

where $f_0$ is first filter coefficient information, where $f_1$ is second filter coefficient information, where $\{\alpha_{00}, \alpha_{10}, \alpha_{01}, \text{and } \alpha_{11}\}$ is said set of intermediate values, where $h_0$ is a first channel estimate, where $h_1$ is a second channel estimate, where m is a noise exponent, and where $>>$ represents a shift operation.

9. A linear least squares error (LLSE) filtering module for use in a communications device, the linear least squares error filtering module comprising:

means for generating a set of intermediate parameter values, based on a set of channel gain values and a noise value, by performing a plurality of addition and subtraction operations with at least reduced use of division or multiplication operations;

means for generating filter coefficient information from said set of intermediate parameter values by performing multiplications, additions and shift based division operations with at least reduced use of non-shift based division operations; and means for performing first and second filtering operations on first and second symbols, respectively, using first and second filters configured in accordance with said generated filter coefficient information, to generate first and second estimated transmitted values.

10. The linear least squares error filtering module of claim 9, further comprising:

means for generating first and second channel gain values included in said set of channel gain values, said first channel gain value being generated from a first channel estimate and a noise exponent, the second channel gain value being generated from a second channel estimate and said noise exponent.

11. The linear least squares error filtering module of claim 10, wherein said means for generating first and second channel gain values generates first and second channel gain values without the use of a non-shift based division operation.

12. The linear least squares error filtering module of claim 10, wherein said means for generating a set of intermediate parameter values generates said set of intermediate parameter values based on a channel correlation value.

13. The linear least squares error filtering module of claim 10, wherein said means for generating filter coefficient information uses said first and second channel estimates, said noise exponent, and said noise value, along with said intermediate parameter values, to generate said filter coefficient information.

14. The linear least squares error filtering module of claim 9, wherein said means for generating a set of intermediate parameter values generates said set of intermediate values in accordance with the equations:

$$\alpha_{00}=\hat{\sigma}^2+E_1, \alpha_{10}=-CROSS, \alpha_{01}=\alpha_{10}{}^*, \text{and } \alpha_{11}=\hat{\sigma}^2+E_o,$$

and where $CROSS=h_0{}^H h_1 >> 2m-4$, and where
$\hat{\sigma}^2 = \sigma^2 >> 2m-4$, where $\{E_0, E_1\}$ is said set of channel gain values, where $\{\alpha_{00}, \alpha_{10}, \alpha_{01}, \text{and } \alpha_{11}\}$ is said set of intermediate values, where CROSS is a channel correlation value, where $\hat{\sigma}^2$ is said noise value, where $\sigma^2$ is a noise variance value, m is a noise exponent, and where $>>$ represents a shift operation.

15. A computer program product for use in a communications device, the computer program product comprising:

a computer readable medium comprising:

code for causing at least one computer to generate a set of intermediate parameter values, based on a set of channel gain values and a noise value by performing a plurality of addition and subtraction operations with at least reduced use of division or multiplication operations;

code for causing said at least one computer to generate filter coefficient information from said set of intermediate parameter values by performing multiplications, additions and shift based division operations with at least reduced use of non-shift based division operations; and code for causing said at least one computer to perform first and second filtering operations on first and second symbols, respectively, using first and second filters configured in accordance with said generated filter coefficient information, to generate first and second estimated transmitted values.

16. A communications device comprising:
a linear least squares error filtering module including at least one processor configured to:
  generate a set of intermediate parameter values, based on a set of channel gain values and a noise value, by performing a plurality of addition and subtraction operations with at least reduced use of division or multiplication operations;
  generate filter coefficient information from said set of intermediate parameter values by performing multiplications, additions and shift based division operations with at least reduced use of non-shift based division operations; and
  perform first and second filtering operations on first and second symbols, respectively, using first and second filters configured in accordance with said generated filter coefficient information, to generate first and second estimated transmitted values;
and memory coupled to said at least one processor.

17. The communications device of claim 16, wherein said at least one processor is further configured to:
  generate first and second channel gain values included in said set of channel gain values, said first channel gain value being generated from a first channel estimate and a noise exponent, the second channel gain value being generated from a second channel estimate and said noise exponent.

18. The communications device of claim 17, wherein said at least one processor is configured to generate first and second channel gain values without the use of a non-shift based division operation.

19. The communications device of claim 17, wherein said at least one processor is configured to generate said set of intermediate parameter values based on a channel correlation value.

20. The communications device of claim 17, wherein said at least one processor is configured to generate filter coefficient information using said first and second channel estimates, said noise exponent, and said noise value, along with said intermediate parameter values.

* * * * *